United States Patent [19]
Fansler et al.

[11] 3,842,687
[45] Oct. 22, 1974

[54] BALLISTICALLY TOLERANT BELLCRANK/ROD-END

[75] Inventors: John David Fansler, Newtown; Stanley F. Okarma, Huntington, both of Conn.

[73] Assignee: United Aircraft Corporation, East Hartford, Conn.

[22] Filed: Dec. 14, 1973

[21] Appl. No.: 424,987

[52] U.S. Cl............ 74/469, 74/519, 403/116, 403/157
[51] Int. Cl.............................. G05g 7/02
[58] Field of Search....... 74/469, 519, 522; 244/78, 244/83 R, 84, 131; 403/116, 157, 158, 161

[56] References Cited
UNITED STATES PATENTS

| | | | |
|---|---|---|---|
| 2,167,230 | 7/1939 | Avigdor | 74/522 |
| 3,193,999 | 7/1965 | Hester | 403/116 X |
| 3,552,786 | 1/1971 | Schmid | 403/158 X |

Primary Examiner—Samuel Scott
Assistant Examiner—F. D. Shoemaker
Attorney, Agent, or Firm—Russell M. Lipes, Jr.

[57] ABSTRACT

A bellcrank and control rod connection configuration achieving projectile damage tolerance through a combination of redundant pivots. Rod ends are connected to a bellcrank in a double pivot fashion so that should either pivot connection become disabled the other pivot connection will permit the maintenance of satisfactory control.

8 Claims, 2 Drawing Figures

PATENTED OCT 22 1974 3,842,687

3,842,687

BALLISTICALLY TOLERANT BELLCRANK/ROD-END

The invention herein described was made in the course of or under a contract or subcontract thereunder with the U.S. Army Aviation Systems Command.

BACKGROUND OF THE INVENTION

1. Field of the Invention

This invention relates to aircraft control systems and more particularly to a control system having improved projectile damage tolerance.

2. Description of the Prior Art

In aircraft used in warfare, every effort is made to minimize the damaging effect on the control system of hits by shell fragments, bullets, rockets and other projectiles. Prior efforts to provide control systems which will assure some degree of aircraft control even though the aircraft has been damaged by gun or rocket fire include the use of duplicate control systems, the manufacturing of heavier and more durable parts, and the use of armor plating to shield sensitive areas. For the most part, these alternatives impose a cost, weight penalty, or increased complexity.

SUMMARY OF THE INVENTION

An object of this invention is to provide an improved aircraft control system.

Another object of the invention is to provide an aircraft control system affording improved protection against damage from enemy gun and rocket fire.

Still another object of the invention is to provide aircraft control system elements which are constructed so that operation will be insured even though damage has been suffered by an element from gun or rocket fire.

In accordance with the invention, a bellcrank in an aircraft control system is connected to a control rod by two pivotable connections. One connection is the typical nut and bolt assembly through aligned holes in the bellcrank and the control rod end in a relatively precise connection. The other connection is a second nut and bolt assembly through an arcuate slot in the bellcrank and a second series or set of holes in the control rod end in a less precise connection.

The foregoing and other objects, features and advantages of the invention become more apparent in the light of the following detailed description of a preferred embodiment thereof, as illustrated in the accompanying drawing.

DESCRIPTION OF A PREFERRED EMBODIMENT

Figure 1:
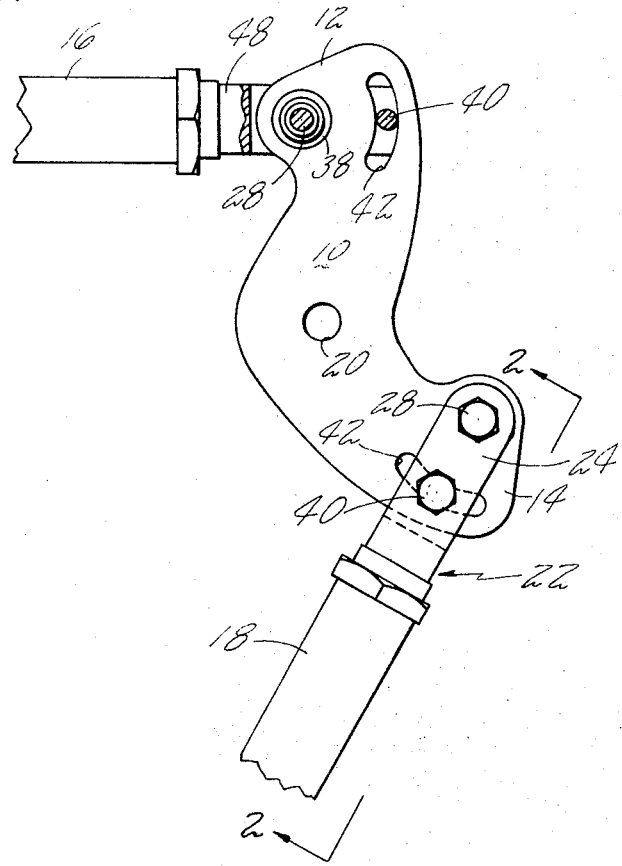
FIG. 1 is a plan view of a bellcrank and control rod end connection having pivots constructed in accordance with this invention.

Referring to FIG. 1, bellcrank 10 is shown having arms 12 and 14 to which control rods 16 and 18, respectively, are connected. The bellcrank rotates about pivot 20 upon motion of the control rods.

Each control rod has a double pivot connection with the bellcrank to assure some degree of protection against the possibility of damage occurring to the connection which would inactivate the control system. This connection will be described with respect to control rod 18. The rod has end portion 22 having finger-like projections 24 and 26 forming a U-shaped structure for receiving a bellcrank arm, in this case arm 14.

Figure 2:
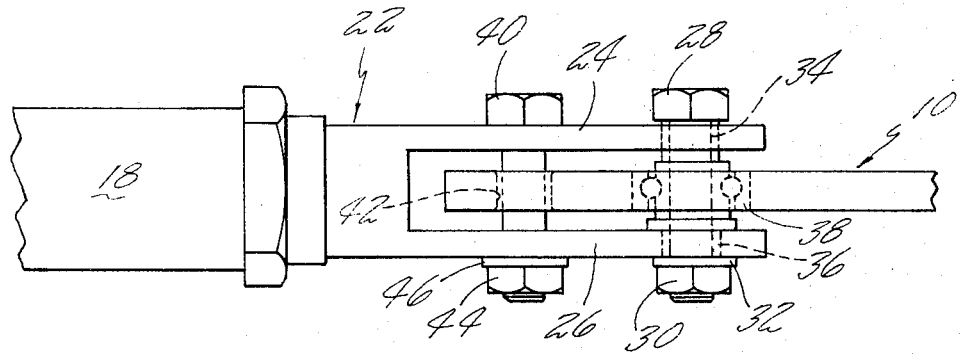
FIG. 2 is a section view through the pivots along line 2—2 in FIG. 1.

The first or primary pivot connection, as shown in both FIGS. 1 and 2, consists of self-retaining bolt 28 passing through holes in fingers 24 and 26 and a hole in bellcrank arm 14. The bolt is retained by nut 30 and one or more flat washers 32 is used under the nut to get the proper adjustment on the bolt. The holes in the fingers are at the end of the control rod — rod end portion combination. The hole in finger 24 has sleeve bushing 34 therein, and the hole in finger 26 has shoulder bushing 36 therein. The hole in bellcrank arm 14 has anti-friction bearing 38 therein. The bushings and the bearing provide a relatively precise connection. The construction of the connection between the bellcrank and the control rod is such that a minimum of friction and a maximum of sensitivity is provided. This is a typical bellcrank connection.

The second or secondary connection, also as shown in both FIGS. 1 and 2, consists of self-retaining bolt 40 passing through holes in fingers 24 and 26 and through arcuate slot 42 in bellcrank arm 14. The bolt is retained by nut 44 and one or more washers 46 is used under the nut. The walls of the slot are spaced slightly from the bolt so as not to interfere in any way with normal movement of the control rod and the bellcrank. The radius of curvature of slot 42 is centered at the rotational axis of the first pivot, and the length of the slot is sufficiently long to permit bellcrank 10 to pivot about primary bolt 28 through its range of normal actuation. This connection provides less precision of action than a primary pivot if it were the only connection, but it does provide operational capability.

In FIG. 1, the near finger projection on end portion 48 for control rod 16 is broken away to show the surface of bellcrank arm 12. In this instance, the positions of the primary close-fitting pivot and the secondary more loosely connected pivot are reversed. The secondary pivot is adjacent the end of the control rod-end portion combination and the primary pivot is located away from the end. The same protective double pivot connection, however, is provided. With both constructions, if either pivot of a rod connection with a bellcrank, and particularly the pivot nearest the end, is struck by gun or rocket fire and rendered inoperative, the remaining pivot will act to retain control continuity. The aircraft should be capable of completing its mission or returning to its base.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

I claim:

1. In an aircraft control system,
a bellcrank, and
at least one control rod connected to said bellcrank, said connection including,
first means attaching an end of said control rod to said bellcrank and providing a primary pivot
second means adjacent said first means attaching the end of said control rod to said bellcrank and providing a secondary pivot, and means permitting limited relative motion between said bellcrank and said control rod about said primary pivot.

2. An aircraft control system in accordance with claim 1 in which the means permitting limited relative motion includes an arcuate slot in the bellcrank.

3. In an aircraft control system,
a bellcrank, and
a control rod connected to said bellcrank,
said connection including:
   a first pivot whereby bolt-like means connects said bellcrank and control rod through a hole in the bellcrank and a corresponding hole in the control rod, and
   a second pivot whereby bolt-like means also connects said bellcrank and control rod through a hole in the control rod and a slot in the bellcrank.

4. An aircraft control system in accordance with claim 3 in which the bellcrank is in arcuate form permitting limited rotational movement of the bellcrank and control rod about the first pivot.

5. An aircraft control system in accordance with claim 3 in which the first pivot is adjacent an end of said control rod and the second pivot is adjacent said first pivot but further removed from the rod end.

6. An aircraft control system in accordance with claim 3 in which the first pivot includes means providing for relatively friction-free movement of the control rod with respect to the bellcrank.

7. An aircraft control system in accordance with claim 4 in which the control rod has finger like projections for receiving the bellcrank therebetween.

8. An aircraft control system in accordance with claim 3 in which the second pivot is adjacent an end of said control rod and the first pivot is adjacent said second pivot but further removed from the rod end.

* * * * *

PO-1050
(5/69)

UNITED STATES PATENT OFFICE
CERTIFICATE OF CORRECTION

Patent No. 3,842,687     Dated October 22, 1974

Inventor(s) John David Fansler and Stanley F. Okarma

It is certified that error appears in the above-identified patent and that said Letters Patent are hereby corrected as shown below:

Column 3, line 19,    after "bellcrank" insert --slot--

Signed and sealed this 24th day of December 1974.

(SEAL)
Attest:

McCOY M. GIBSON JR.
Attesting Officer

C. MARSHALL DANN
Commissioner of Patents